H. M. FLETCHER.
TRACTION VEHICLE.
APPLICATION FILED SEPT. 12, 1910.
1,024,066.
Patented Apr. 23, 1912.
2 SHEETS—SHEET 2.
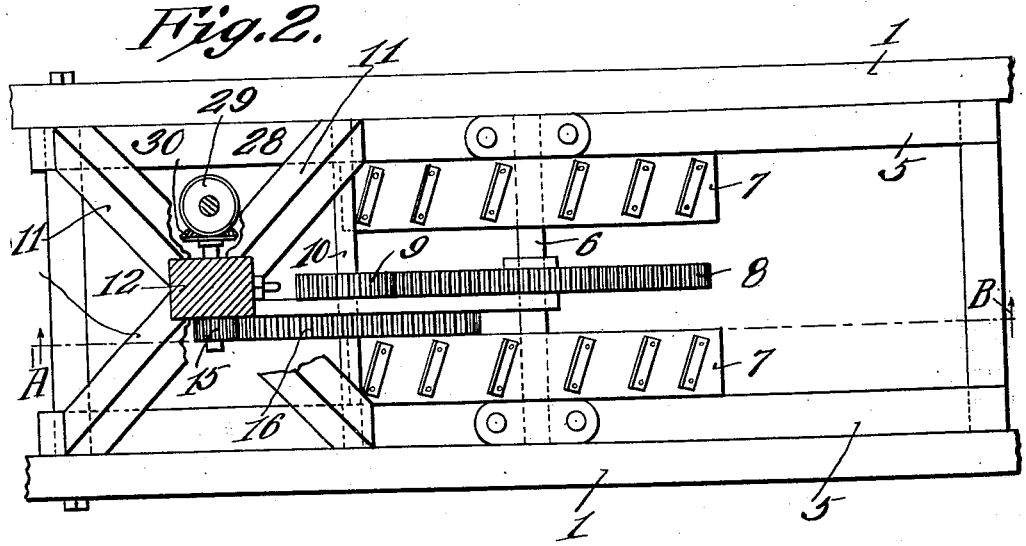
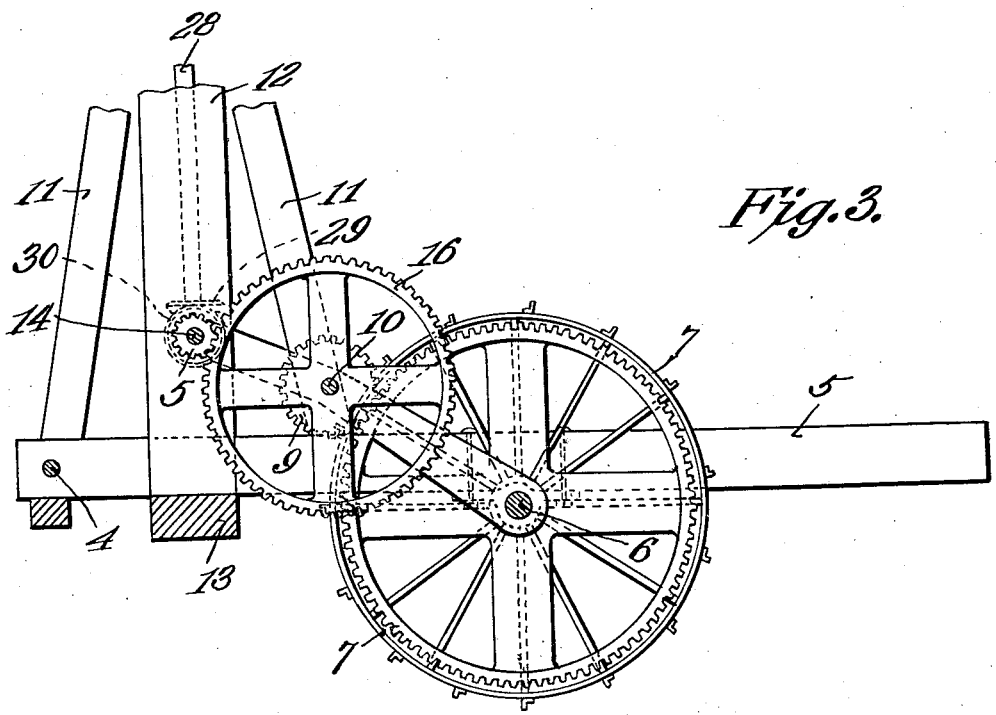
Witnesses
Frank B. Woody
Herbert D. Lawson
Henry M. Fletcher, Inventor
by C. A. Snow & Co.
Attorneys

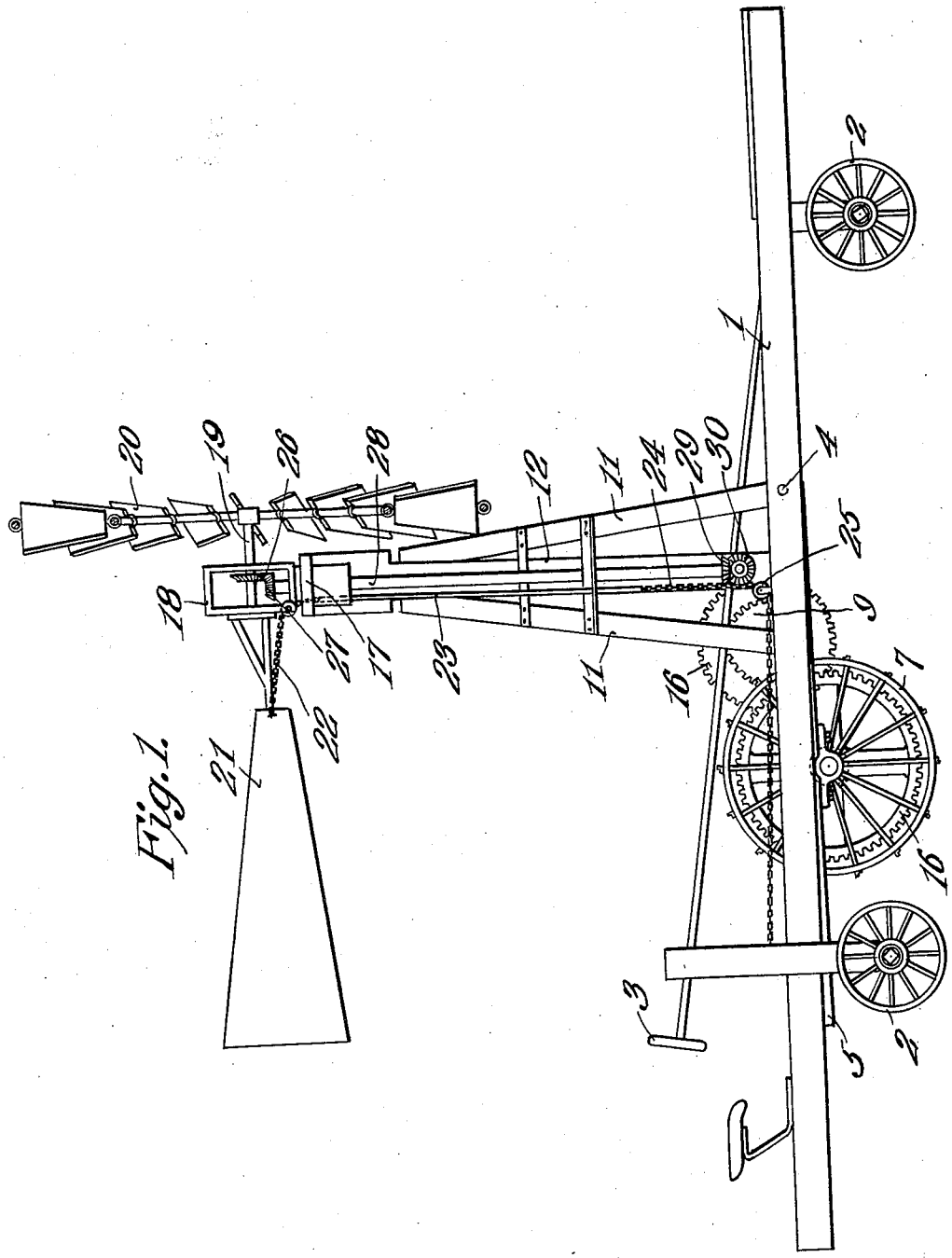

UNITED STATES PATENT OFFICE.

HENRY M. FLETCHER, OF PLAINVIEW, TEXAS.

TRACTION-VEHICLE.

1,024,066.

Specification of Letters Patent. Patented Apr. 23, 1912.

Application filed September 12, 1910. Serial No. 581,582.

*To all whom it may concern:*

Be it known that I, HENRY M. FLETCHER, a citizen of the United States, residing at Plainview, in the county of Hale and State of Texas, have invented a new and useful Traction-Vehicle, of which the following is a specification.

This invention relates to traction vehicles and is especially designed for use in drawing plows, cultivators and other agricultural machines, and its principal object is to provide a vehicle of this character adapted to be propelled by wind power, said vehicle carrying a wind wheel and mechanism operated thereby for transmitting motion to traction wheels supported within the vehicle.

A further object is to so mount the traction wheels that the same are capable of moving upwardly and downwardly independent of the vehicle to which they are connected, said traction wheels supporting practically the entire weight of the wind wheel and the mechanism operated thereby so as to be thus held firmly in engagement with the ground in spite of any irregularities in the contour thereof and thus insure the positive actuation of the vehicle during the rotation of the power wheel.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of the claim without departing from the spirit of the invention.

In the accompanying drawings the preferred form of the invention has been shown.

In said drawings:—Figure 1 is a side elevation of a traction vehicle constructed in accordance with the present invention. Fig. 2 is a plan view of a portion of said vehicle, the mast or tower being shown in section. Fig. 3 is a section on line A—B Fig. 2.

Referring to the figures by characters of reference 1 designates the frame of the vehicle, the same being supported by wheels 2, the front wheels being preferably under the control of steering mechanism which may be operated by means of a hand wheel 3 or the like. Inasmuch as this steering mechanism constitutes no part of the present invention, it is not deemed necessary to illustrate it.

A pivot rod 4 extends transversely within the frame 1 and has a supplemental frame 5 mounted thereon, said supplemental frame being disposed between the sides of the frame 1 and being provided, at a point between its ends, with a drive axle 6 carrying traction wheels 7. A gear 8 is secured to and rotates with the axle 6 and meshes with another gear 9 secured to a shaft 10. This shaft is supported above the supplemental frame 5 and is journaled within braces 11 extending upwardly from said supplemental frame and secured to a mast 12. This mast bears downwardly on a sill 13 secured to the supplemental frame and may be of any desired height. A shaft 14 extends transversely through and is journaled within the mast and has a gear 15 thereon which meshes with a gear 16 secured to the shaft 10. It will thus be seen that the entire weight of the gears, and all parts supported by the mast is supported by the traction wheels 7 and the pivot rods 4 and, as a result, during the movement of the vehicle over an uneven surface, the wheels 7 will be held in constant engagement with said surface.

Arranged on the upper end of the mast 12 is a table 17 on which the head 18 of the wind motor is mounted to rotate. This head has a shaft 19 journaled within it and carrying a wind wheel 20 at one end. A vane 21 extends from the other side of the head and may be shifted relative to the wheel by means of a chain 22 or the like extending downwardly through the table and head and connected, by a rod 23 with another chain 24 mounted on a guide sheave 25. This chain 24 may be secured in any desired manner to the frame 1 so as to hold the vane in a predetermined position relative to the wheel 20.

A gear 26 is secured to shaft 19 and meshes with a gear 27 secured to a vertical shaft 28 extending downwardly alongside of the mast 12. This shaft 28 is provided, at its lower end, with a bevel gear 29 meshing with a gear 30 on one end of the shaft 14.

It will be understood that when the vane 21 is released, it will lie parallel with the wheel 20 and will hold the said wheel with its edge to the wind so that the machine will not be operated. When the vane 21 is shifted to a position at right angles to the wheel 20, however, it will promptly bring the wheel with its face to the wind and said wheel will be rotated and drive the shaft 19 and gear 26. Motion will be transmitted from this gear through gear 27, shaft 28 and gear 29, to gear 30 and shaft 14. From this shaft the train of gears shown in Figs. 2 and 3 will transmit motion to the drive axle 6 and the traction wheels 7. It will be apparent therefore that the machine will thus be driven forward irrespective of the direction of the wind and can therefore be utilized for drawing agricultural machines and the like. As has already been stated, the weight of the motor is disposed entirely between the traction wheels 7 and the pivot rod 4 and, therefore, the said traction wheels will be held firmly in engagement with the ground under all conditions, this being permitted in view of the fact that the supplemental frame 5 is capable of swinging upwardly and downwardly independently of the main frame 1. Furthermore, as the mast extends perpendicularly from the supplemental frame, it acts as a lever by means of which the pressure exerted against the wheel 20 by the wind is transmitted to the supplemental frame and the wheels 7 thus forced with increased pressure into engagement with the surface on which the vehicle is mounted. This pressure, in addition to that exerted by the weight of the parts carried by the supplemental frame, results in the engagement of the wheels 7 with the ground to the maximum degree.

What is claimed is:—

A traction vehicle including a wheel supported main frame, a supplemental frame pivotally mounted at its front end within the main frame at a point between the supporting wheels, said supplemental frame being movable about an axis extending transversely of the machine, a traction wheel connected to and supporting the rear end portion of the supplemental frame, a mast upstanding from the supplemental frame adjacent the pivot thereof, a wind operated motor carried by the mast, means for transmitting motion from said motor to the traction wheel, the weight of the motor and mechanism being adapted to hold the traction wheel in constant engagement with the ground and irrespective of the movement of the main frame, said mast constituting a lever for transmitting the force of head wind pressure received by the motor, through the traction wheel to the surface on which the wheel is mounted.

In testimony that I claim the foregoing as my own, I have hereto affixed my signature in the presence of two witnesses.

HENRY M. FLETCHER.

Witnesses:
W. E. ARMSTRONG,
W. A. MORTER.

Copies of this patent may be obtained for five cents each, by addressing the "Commissioner of Patents, Washington, D. C."